United States Patent [19]

Weaver et al.

[11] Patent Number: 4,541,805
[45] Date of Patent: Sep. 17, 1985

[54] AUDIO ADAPTER FOR SEWING MACHINE

[76] Inventors: Delbert J. Weaver, 623 E. 3735 South, Salt Lake City, Utah 84106; Kevin D. Weaver, 3863 Dimrall Dr., Kearns, Utah 84118

[21] Appl. No.: 604,030

[22] Filed: Apr. 26, 1984

[51] Int. Cl.⁴ ............................................. G09B 19/00
[52] U.S. Cl. .................... 434/95; 112/121.11; 360/12; 434/319; 434/219
[58] Field of Search .................. 434/95, 224; 112/121.11, 158 E; 360/12, 79

[56] References Cited

U.S. PATENT DOCUMENTS 3,261,524 7/1966 Heinisch .............................. 360/12
4,301,753 11/1981 Meier .................................. 434/224
4,465,003 8/1984 Makabe et al. .................. 112/158 E Primary Examiner—Richard C. Pinkham
Assistant Examiner—Leo P. Picard
Attorney, Agent, or Firm—Trask & Britt

[57] ABSTRACT

An audio adapter for an electric or electronic sewing machine is disclosed. The adapter may have a holder sized to accept a typical DC powered microcassette tape player, an AC-DC power converter and leads for attachment to the on-off switch of the sewing machine and to the microcassette player.

9 Claims, 6 Drawing Figures

AUDIO ADAPTER FOR SEWING MACHINE

BACKGROUND OF THE INVENTION

1. Field

This invention relates to electric sewing machines with an audio function whereby oral instructions may be provided from a recorded medium to an operator of the sewing machine.

2. State of the Art

A prior technique for providing a recorded audio feature with a sewing machine is disclosed in U.S. Pat. No. 4,301,753 of Meier. The electronic and mechanical features of the tape player are built as an integral part of the sewing machine. This approach works well for newly constructed machines. However, it cannot be adapted as an add-on feature to existing sewing machines.

Another embodiment disclosed in the Meier patent involved a tape player constructed into the carrying cabinet of a sewing machine. This construction does not provide the tape player in close proximity to the machine controls. The cabinet is large and bulky and would not fit readily on most sewing tables.

OBJECTS OF THE INVENTION

It is an object of the instant invention to provide an electric sewing machine with an add-on audio instructional function.

Another object of the instant invention is to provide an audio instructional device which is compatible with a variety of sewing machine models.

A further object of the instant invention is to provide an audio instructional device for sewing machines which is simple to install and easy to use.

SUMMARY OF THE INVENTION

A combination electrically operated sewing machine and cassette tape player has a box-like holder with a pocket adapted to hold a DC-powered microcassette tape player. The box-like holder also contains an AC-DC converter which electrically interconnects with the on-off switch of the sewing machine and with the microcassette tape player.

The instant invention comprises a combination electrically operated sewing machine and electronic microcassette tape player. The sewing machine is a conventional, electrically operated sewing machine having an upright post, also identified as a standard, and cantilevered arm attached to the post. The reverse side, that is, the side opposite the operator, of the post and head are generally substantially free of any protrusions, projections and the like. A substantially rigid, box-like holder having a pocket sized and shaped to hold a DC-powered microcassette tape player is attachable to the reverse side of the sewing machine post or head. The holder has external dimensions to permit it to be substantially concealed by the arm or post of the sewing machine when it is attached to their rear surface. The holder also contains an AC-DC converter having DC leads connectable to the microcassette tape player and AC leads connectable to the electric switch of the sewing machine.

A particularly useful form of the instant invention resides in its construction as a kit for retrofitting existing sewing machines to have an audio-instruction capability. The retrofit kit which may be used on original equipment machines (OEM), comprises a DC-powered microcassette player, and a microcassette tape player box-like holder having a pocket sized and shaped to hold the tape player. The holder preferably has external dimensions sufficiently small that it may be substantially concealed by the body of the sewing machine to which it is attached. Also associated with the kit is an AC-DC converter to convert 110 volt electrical supply to the DC voltage necessary for the microcassette player, typically either 3 or 6 volts. The converter is sized and shaped to fit within the box-like holder. The converter also contains AC leads which are connectable to the on-off switch of the sewing machine and DC leads which are connectable to the tape player. Thus, the power to the tape player may be controlled by the on-off switch of the sewing machine. The holder further has means for being attached to the body of the sewing machine.

Additionally, the kit may contain a folder or book of instructional microcassettes having various instructional information on the set of tapes for explaining the basic functions of the machine, explaining the manner in which the machine is threaded, and explaining the manner in which certain basic stitches are performed. Also associated with the folder are certain graphic illustrations of the type of stitch which is taught by a particular tape.

Further description of the invention may be facilitated by reference to the attached drawings.

DESCRIPTION OF THE ILLUSTRATED EMBODIMENT

Figure 1:
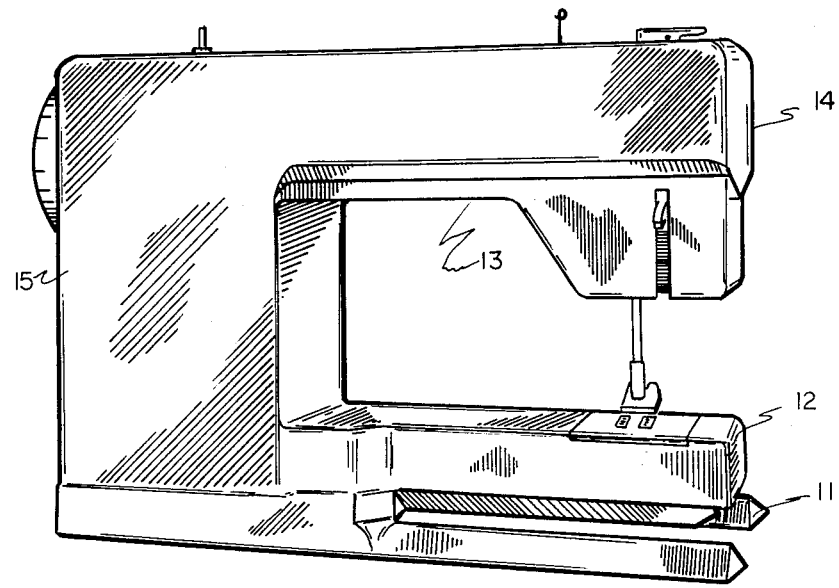
FIG. 1 is an elevational rear view of a conventional, portable electric sewing machine.

FIG. 1 is an elevational rear view of a typical portable electric sewing machine. The machine has a base or pedestal 11, a lower arm 12, an upper arm 13, a head 14 and a standard 15. The arm and head are supported in cantilever fashion by the standard 15. The machine may have an overall length of about 16 to about 18 inches at the pedestal, and an overall length of about 14 to about 16 inches including the post, arm and head. The standard or post may typically have a width of about 4 to about 5 inches and a height of about 8 to about 10 inches. The length of the arm and standard may be about 10 inches. The thickness of the arm may be about 3 to about 4 inches.

Figure 2:
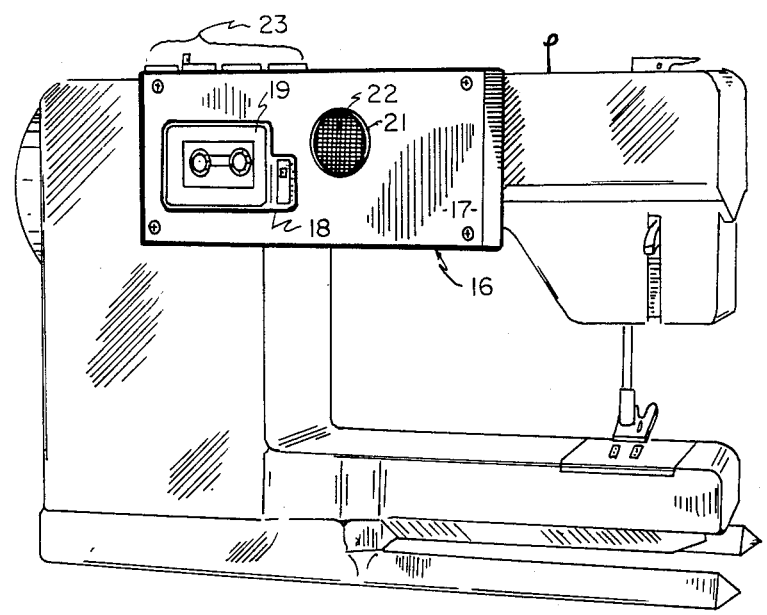
FIG. 2 is an elevational rear view of a conventional, portable electric sewing machine with a microcassette tape player holder attached thereto.

The machine illustrated in FIG. 2 is similar to the machine of FIG. 1, except that a microcassette player holder is shown attached to the reverse side of the sewing machine. The microcassette tape player attachment device 16 has a face plate 17 covering an open box-like structure. A microcassette access opening 18 is provided in the face to permit access to the microcassette window 19 which permits insertion of a microcassette 20. A speaker access opening 21 is also provided so that the sound emanating from the speaker 22 may not be muffled. An opening along the top surface or edge of the holder 16 exists which permits the controls 23 of the microcassette player to protrude or to permit easy access by the fingers of the operator of the machine.

The holder 16 has nominal dimensions of about 4 inches in height, approximately 6 inch length and a depth of about one and one-half inch to about one and three-quarters inches.

Figure 3:
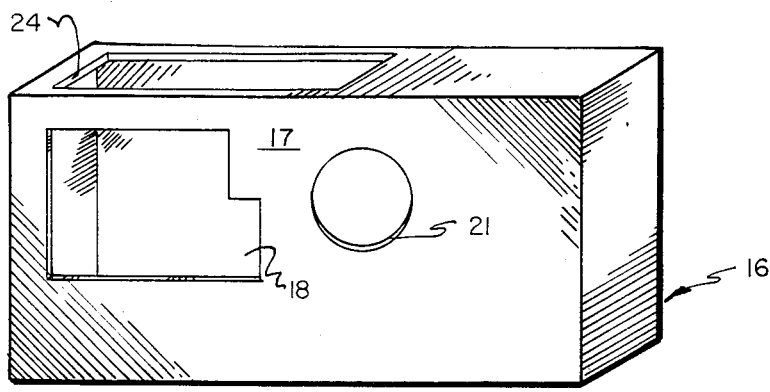
FIG. 3 is a perspective view of a microcassette tape player holder adapted for attachment to a sewing machine.

The top surface of the holder 16 is illustrated in FIG. 3 which is a perspective view of the holder. The opening 24 in the upper edge of holder 16 may be limited only to the portion of the length of holder 16 or it may extend along substantially the entire upper surface of holder 16 or at least for a sufficient length that a typical small microcassette tape player could be inserted through that opening and rest within the holder 16.

Figure 4:
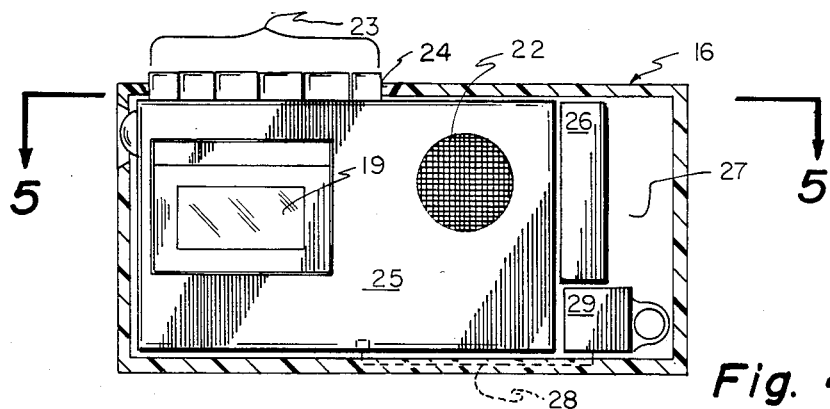
FIG. 4 is an elevational, frontal view of the holder of FIG. 3 with the face plate removed.

FIG. 4 is a frontal view of a holder 16 with the face plate 17 removed. A microcassette tape player 25 is shown positioned within the holder with its controls 23 oriented upward and protruding through opening 24. A block 26 is attached to the back 27 of the holder to serve as a stop to hold the microcassette tape player in position.

A wire 28 attaches the tape player 25 to an AC-DC converter 29 positioned between block 26.

Figure 5:
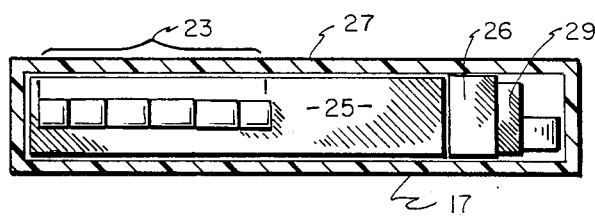
FIG. 5 is a plan view of the holder of FIG. 4 along section lines 5—5.

A top view of the holder is illustrated in FIG. 5, representing the holder of FIG. 4 along section lines 5—5 with the face plate 17 on the holder.

Figure 6:
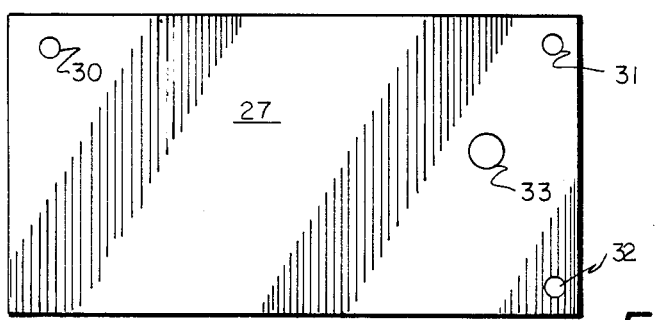
FIG. 6 is an elevational rear view of the holder of FIG. 4.

A rear view of the holder is illustrated in FIG. 6 which shows holes 30, 31 and 32 which are screw holes for accepting screws for mounting the holder 16 to the arm and standard of a sewing machine. Hole 33 is provided for passing through the AC wires from the AC-DC converter to pass through a hole in the arm of the sewing machine (not shown) whereby the AC wires may be wired to an on-off switch of the sewing machine.

Typical microcassette transcriber/recorders useful in the instant invention are those having nominal dimensions as follows: a width of less than about 3 inches, a length of less than about 5 inches, and a depth of less than about $1\frac{3}{4}$ inches. Such microcassette units are readily available commercially and typically are provided with a DC power supply wherein the electrical current is provided by two or more small batteries. Some typical microcassette units useful in the instant invention are as follows: General Electric Microcassette Recorder Model GE3-5338 and Radio Shack Realistic Catalog No. 14-817.

The AC-DC converter generally is one which converts 110 volt AC electrical power to either 3 volt or 6 volt DC electrical power. Such units may be readily obtained commercially. Typical units useful in the instant invention are as follows: General Electric AC Power Converter 5-1751 converts 110 volt AC power to 3 volt DC power).

The holder of the instant invention may be made of any suitable, substantially rigid material such as rigid plastics or metals. Generally plastics are preferred as a construction material inasmuch as they are easy to work with and easy to mass produce. A holder may be formed of either thermoplastic or thermosetting resins. Forming techniques may be by injection molding of a vaccuum-forming or similar plastic forming operations.

The instant invention may be utilized for attachment to virtually any electric sewing machine, especially portable electric sewing machines, and especially those having a plastic outer shell. Typical machines which may be fitted with the instant invention are those made by Elna, White, Singer and the like. The instant invention is particularly advantageous inasmuch as it may be provided in a kit form or as an assembled unit. It can be attached to a machine at a sewing machine manufacturing plant or it can be attached as a retrofit unit after the machine is in the hands of a retail dealer or customer. In providing for retrofit capability, the instant invention is particularly advantageous inasmuch as many seamstresses are very experienced and do not require any audio instructional feature to their sewing machines. Thus, such seamstresses would not want to pay the additional cost of having an instructional system integral with the machine.

The invention is further particularly advantageous inasmuch as it will fit substantially any commercial electrical sewing machine made for home use. Also, a great number of different types of cassette units may be utilized with the invention. The device is easy to install and operate and has such small size that when mounted on the reverse side of a sewing machine, it is virtually concealed.

The audio instructional retrofit capability provided by the instant invention is particularly advantageous inasmuch as when combined with an expandable tape library, it may be used as either a sales or teaching tool. For example, a retail dealer may fit certain machines with the audio instructional capability provided by the instant invention to explain certain basic features, advantages, cost comparisons and so forth applicable to a certain machine in his showroom as compared with competitors' machines or other machines of different price ranges capabilities, etc. Also, a retail dealer may utilize the audio instructional capability to give either initial lessons to customers who have purchased a machine different than the one they are accustomed to or for customers who are inexperienced seamstresses, and for giving reinforcement instruction to customers who have had previous instruction by teachers. Also, the invention is very advantageous for home use by the occasional seamstress who may need instruction concurrent with her operating of the machine to perform a particular function.

The audio instructional capability which the instant invention provides to sewing machines may be very useful for schools whereby the teacher may use such audio instructional capability for make-up lessons and for teaching students who are at different performance levels within the same class so that individual instruction at the particular achievement level of the student may be provided.

We claim:

1. A combination electrically operated sewing machine and cassette tape player comprising:
   a conventional electrically operated sewing machine having an upright post to which a cantilevered arm is attached, the back side of said post and arm being substantially free of protrusions;
   a substantially rigid box-like holder having a pocket sized and shaped to hold a DC powered microcassette, said holder having external dimensions sized to permit the holder to be substantially concealed by the arm or post of said sewing machine when said holder is attached to the rear surface of said arm or post; and an AC-DC converter contained within said holder, said converter having DC leads connectable to a microcassette tape recorder and AC leads connectable to the electrical on-off switch of said sewing machine.

2. The combination of claim 1 wherein said holder has attachment means for attaching said holder to said sewing machine post or arm.

3. The combination of claim 2 wherein said attachment means consists of holes in the body of said holder adjacent said post through which screws pass to attach said holder to said post.

4. The combination of claim 1 wherein said holder has at least one edge opening of sufficient size to permit protrusion of the controls of said microcassette tape player.

5. The combination of claim 3 wherein said holder is oriented and positioned on said machine so that said controls are positioned adjacent the top of the upper surface of the head or post.

6. The combination of claim 1 wherein said holder comprises two components, a base and a lid, whereby said pocket is formed by the joining of said lid with said base.

7. The combination of claim 1 wherein said holder is a unitary structure.

8. The combination of claim 1 wherein the pocket of said holder is sized to accept a variety of microcassette tape players having a width of less than about 4 inches, a thickness of less than about 6 inches, and a height of less than about 1½ inches.

9. The combination of claim 1 wherein access openings are provided in said holder for the tape player controls, the cassette insert window of the player, and the speaker of the player.

* * * * *